(12) United States Patent
Parker et al.

(10) Patent No.: US 8,580,201 B2
(45) Date of Patent: Nov. 12, 2013

(54) WICKING-BASED REAGENT-SOLUTION DRAINING IN AN AUTOMATED SYSTEM

(75) Inventors: Hsing-Yeh Parker, Woodinville, WA (US); John C. Tabone, Bothell, WA (US); John Mulligan, Seattle, WA (US)

(73) Assignee: OligoCo, Inc., Bothell, WA (US)

( * ) Notice: Subject to any disclaimer, the term of this patent is extended or adjusted under 35 U.S.C. 154(b) by 17 days.

(21) Appl. No.: 12/932,337

(22) Filed: Feb. 22, 2011

(65) Prior Publication Data

US 2011/0236270 A1    Sep. 29, 2011

Related U.S. Application Data

(60) Provisional application No. 61/306,906, filed on Feb. 22, 2010, provisional application No. 61/312,862, filed on Mar. 11, 2010.

(51) Int. Cl.

| | | |
|---|---|---|
| *B01J 19/00* | (2006.01) | |
| *B01J 8/00* | (2006.01) | |
| *B01J 8/04* | (2006.01) | |
| *C12Q 1/68* | (2006.01) | |
| *G01N 31/00* | (2006.01) | |
| *G01N 33/00* | (2006.01) | |
| *G01N 31/22* | (2006.01) | |
| *G01N 33/52* | (2006.01) | |
| *B01L 3/00* | (2006.01) | |
| *B01L 99/00* | (2010.01) | |
| *B01L 3/02* | (2006.01) | |
| *F04D 19/00* | (2006.01) | |
| *B01D 21/00* | (2006.01) | |

(52) U.S. Cl.
USPC ............. 422/131; 422/50; 422/62; 422/63; 422/129; 422/130; 422/187; 422/400; 422/401; 422/407; 422/420; 422/421; 422/422; 422/423; 422/424; 422/500; 422/501; 422/502; 422/503; 422/504; 422/507; 422/509; 422/520; 422/600; 422/603; 422/608; 422/612; 422/616; 422/617; 422/650

(58) Field of Classification Search
USPC ............... 422/50, 62, 63, 129, 131, 400, 401, 422/407, 420–424, 500, 503, 504, 507, 509, 422/520, 187, 600, 603, 608, 612, 616, 422/650; 435/283.1, 287.1, 288.3–288.5
See application file for complete search history.

(56) References Cited

U.S. PATENT DOCUMENTS

| | | |
|---|---|---|
| 5,472,672 A | 12/1995 | Brennan |
| 6,074,613 A | 6/2000 | Harness |

(Continued)

FOREIGN PATENT DOCUMENTS

WO    WO 2007/125407 A1 * 11/2007

*Primary Examiner* — Walter D Griffin
*Assistant Examiner* — Natasha Young
(74) *Attorney, Agent, or Firm* — Olympic Patent Works, PLLC

(57) ABSTRACT

Embodiments of the present invention include processing steps and subsystems, within automated-biopolymer-synthesis systems and within other automated systems for organic-chemistry-based processing, for removing reagent solutions and solvents from reaction chambers following various synthetic reaction steps and washing steps undertaken during biopolymer synthesis. Embodiments of the present invention employ any of various different types of liquid-absorbing materials to wick, or remove by capillary action, liquids from reaction chambers. Wicking-based methods and subcomponents of the present invention remove significantly greater fractions of solutions from reaction chambers than conventional methods and subsystems and, in addition, are mechanically simpler and produce fewer deleterious side effects than currently used methods and subsystems.

17 Claims, 16 Drawing Sheets

(56) References Cited

U.S. PATENT DOCUMENTS

| | | |
|---|---|---|
| 6,258,323 B1 | 7/2001 | Hormann |
| 6,800,250 B1 | 10/2004 | Hunicke-Smith |
| 7,112,281 B2 * | 9/2006 | Busnach et al. ............... 210/650 |
| 8,211,370 B2 * | 7/2012 | Downing ...................... 422/131 |
| 2002/0031833 A1 * | 3/2002 | Heyneker et al. ............... 436/46 |
| 2005/0191663 A1 * | 9/2005 | Beattie ............................... 435/6 |
| 2005/0281719 A1 * | 12/2005 | Brennan ........................ 422/130 |
| 2006/0120921 A1 * | 6/2006 | Elliot et al. ...................... 422/63 |
| 2009/0143353 A1 | 6/2009 | Kawakami et al. |
| 2009/0181463 A1 * | 7/2009 | Chen ............................. 436/150 |
| 2010/0176144 A1 * | 7/2010 | Askinasi ......................... 221/71 |

\* cited by examiner

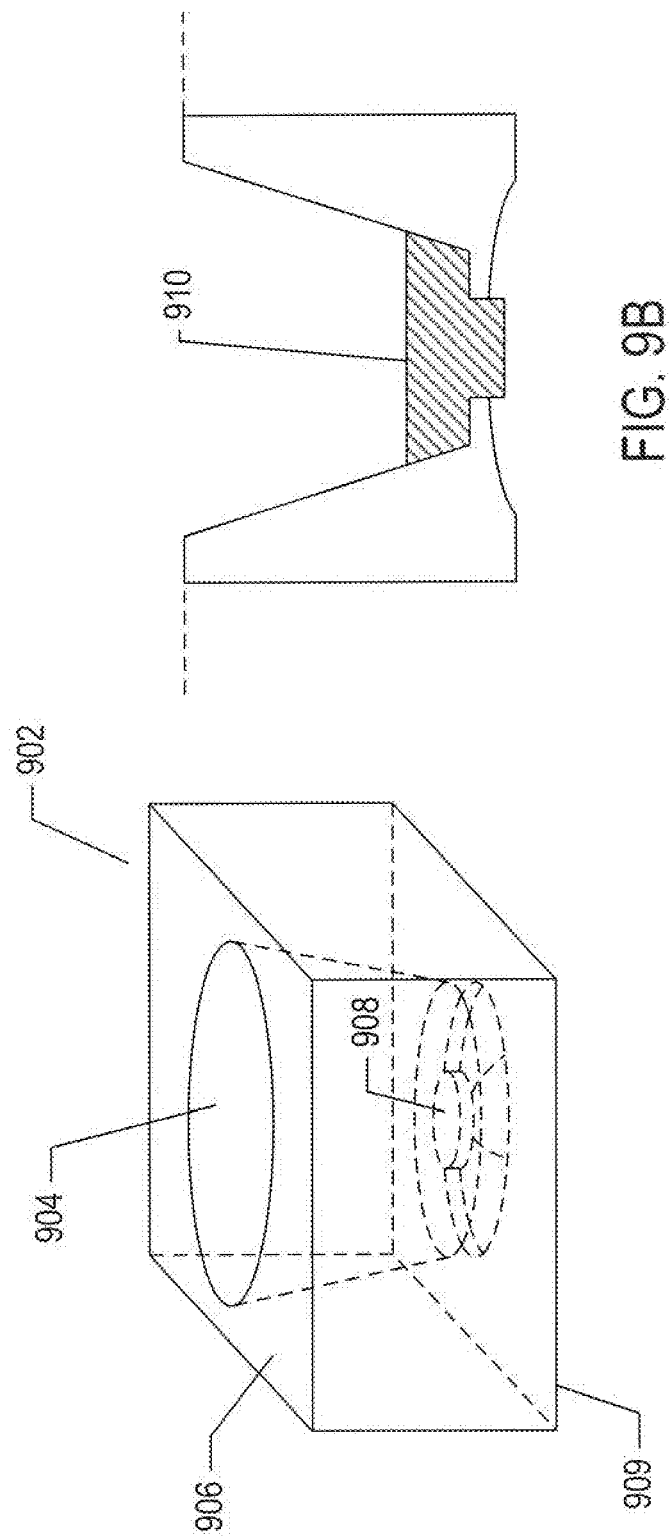

WICKING-BASED REAGENT-SOLUTION DRAINING IN AN AUTOMATED SYSTEM

CROSS-REFERENCE TO RELATED APPLICATIONS

This application claims the benefit of Provisional Application No. 61/306,906 filed Feb. 22, 2010 and Provisional Application No. 61/312,862, filed Mar. 11, 2010.

TECHNICAL FIELD

The present invention is related to systems for automated synthesis of biopolymers and synthetic polymers and other organic-chemistry-based processes, and, in particular, to a subsystem of an automated-polymer-synthesis system for removal of reagent solutions and solvents from reaction chambers that employs wicking, or capillary action, to draw fluids from the reaction chambers.

BACKGROUND

Biopolymers, including deoxyribonucleic acid ("DNA"), ribonucleic acid ("RNA"), proteins, polysaccharides, and more complex biopolymers together form the chemical and structural framework for living organisms. Biopolymers serve as a repository for genetic information, catalyze myriad different chemical reactions within organisms, provide many different types of intracellular and intercellular information transmission and communication within organisms, and provide the structural components for cells, organs, and organisms.

During the past century, great strides have been made understanding and learning to manipulate the molecular and cellular biochemical machinery of living organisms. Once the chemical identities and structures of biopolymers were discovered and elaborated, researchers began to chemically synthesize biopolymers and biopolymer fragments to use as tools for research as well as for various types of manufacturing processes. For example, synthesis of oligonucleotides, short DNA and RNA biopolymers having lengths of up to approximately 200 monomer units, provides oligonucleotides of specific sequences that are used to initiate enzyme-catalyzed transcription of DNA, as probes in microarrays and other analytical instruments, for manipulating and controlling gene expression in bacteria and other organisms, and for many other purposes. Similarly, synthesis of peptides, short polymers of amino-acids subunits, provides peptide pharmaceuticals, probes, catalysts, and other useful peptide-based products.

Automated-biopolymer-synthesis systems have been commercially available for many years. Many automated-biopolymer-synthesis systems employ solid substrates, such as polystyrene beads, to which nascent biopolymers are covalently bound and grown by repeating a cycle of monomer-addition reaction steps. The solid substrate allows the reagents used during a reaction step to be easily rinsed from the nascent biopolymers and solid substrate to prepare for a subsequent reaction step. Current automated-biopolymer-synthesis systems generally produce yields of 10, 100, or more nanomoles of each particular biopolymer. However, many of the more recent applications for oligonucleotides and other biopolymers use far smaller amounts of each particular oligonucleotide or other biopolymer, often in the 1 to 100 picomolar range. Many of the currently available automated-oligonucleotide-synthesis systems do not provide economical production of the small amounts of particular oligonucleotides needed for many of the more recent applications. Overproduction of oligonucleotides is expensive, because the monomers and reagents used during the synthetic processes are expensive and used in proportion to molar amounts of product oligonucleotides, and the synthetic steps employ hazardous and toxic reagents that inevitably end up in a waste stream that is expensive to monitor and dispose of.

Because of the disparities between the current demand for many different particular oligonucleotides and other biopolymers in very small amounts, and the comparatively large amounts of oligonucleotides and other biopolymers produced by currently-available automated-biopolymer-synthesis systems, researchers and developers, manufacturers, biopolymer suppliers, and others continue to seek new types of systems and methods for cost-effective automated synthesis of small amounts of particular oligonucleotides and other biopolymers. In certain cases, processing steps and components of currently available, relatively large-volume automated-biopolymer-synthesis systems can be scaled down for developing small-volume systems. However, in certain cases, processes and components of the currently-available large-volume automated-biopolymer-synthesis systems do not scale down effectively for incorporation into small-volume systems. As a result, researchers, designers, and manufacturers continue to seek new processes, components, and sub-components to replace those processes, components, and sub-components of currently available large-volume automated-biopolymer-synthesis systems that cannot be scaled down for incorporation into small-volume systems.

SUMMARY

Embodiments of the present invention include processing steps and subsystems, within automated-biopolymer-synthesis systems and within other automated systems for organic-chemistry-based processing, for removing reagent solutions and solvents from reaction chambers following various synthetic reaction steps and washing steps undertaken during biopolymer synthesis. Embodiments of the present invention employ any of various different types of liquid-absorbing materials to wick, or remove by capillary action, liquids from reaction chambers. Wicking-based methods and subcomponents of the present invention remove significantly greater fractions of solutions from reaction chambers than conventional methods and subsystems and, in addition, are mechanically simpler and produce fewer deleterious side effects than currently used methods and subsystems.

BRIEF DESCRIPTION OF THE DRAWINGS

FIGS. 9A-B illustrate an individual reaction chamber, or well, used in a low-volume automated-oligonucleotide-synthesis system that represents one embodiment of the present invention.

DETAILED DESCRIPTION

Certain embodiments of the present invention are directed to wicking-based processes, components, and subcomponents within automated biopolymer-synthesis systems for removing reagent solutions and solvents from reaction chambers at the completion of reaction and other processing steps of a monomer-addition cycle. In the following discussion, automated-oligonucleotide-synthesis systems are used as example systems that incorporate embodiments of the present invention. However, embodiments of the present invention may be similarly incorporated within automated polymer-synthesis systems that synthesize other types of biopolymers and synthetic polymers as well as in other organic-chemistry-based automated processing.

Figure 1:
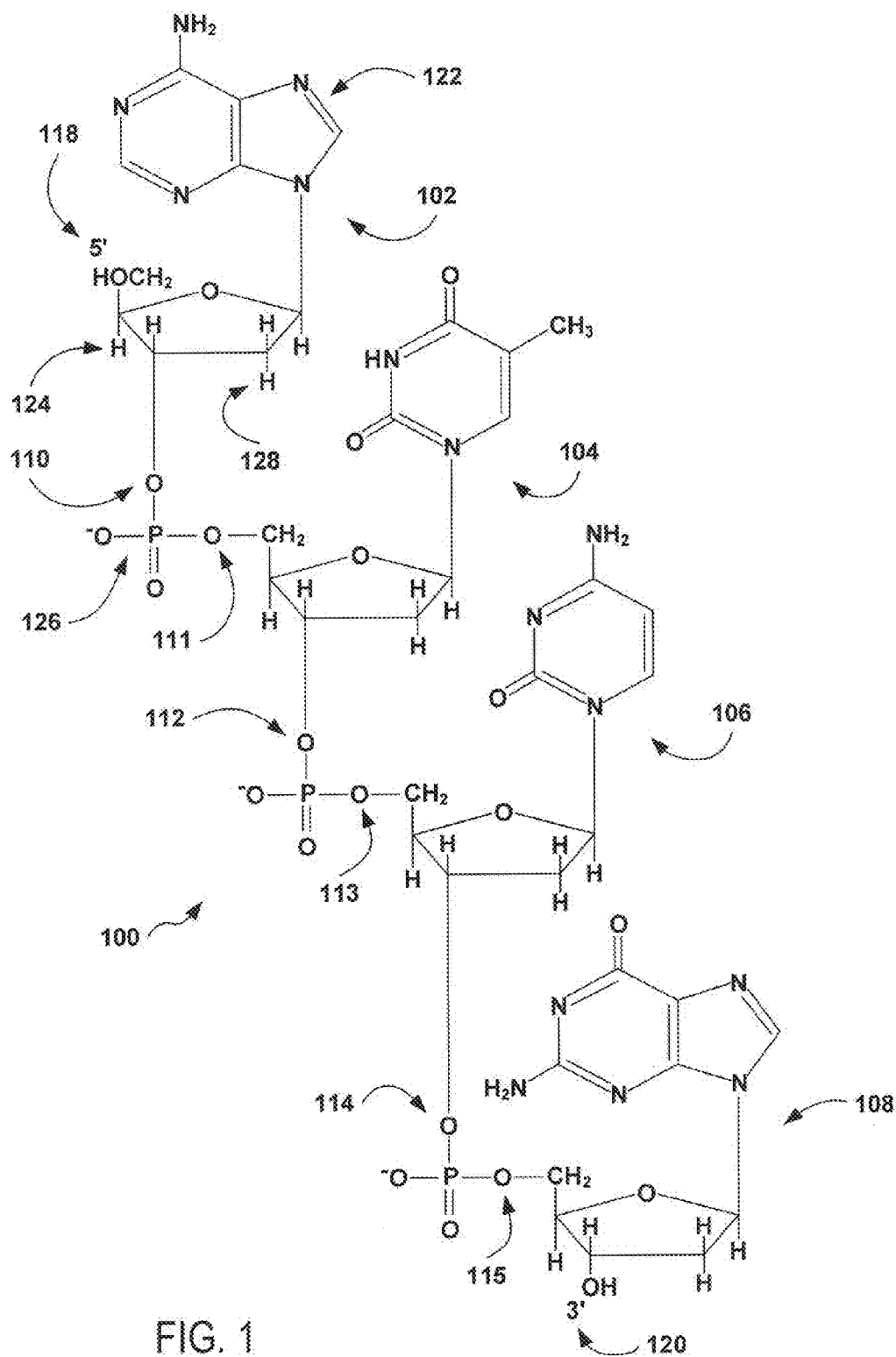
FIG. 1 illustrates a short DNA polymer.

Deoxyribonucleic acid ("DNA") and ribonucleic acid ("RNA") are linear polymers, each synthesized from four different types of subunit molecules. The subunit molecules for DNA include: (1) deoxy-adenosine, abbreviated "A," a purine nucleoside; (2) thymidine, abbreviated "T," a pyrimidine nucleoside; (3) deoxy-cytosine, abbreviated "C," a pyrimidine nucleoside; and (4) deoxy-guanosine, abbreviated "G," a purine nucleoside. The subunit molecules for RNA include: (1) adenosine, abbreviated "A," a purine nucleoside; (2) uracil, abbreviated "U," a pyrimidine nucleoside; (3) cytosine, abbreviated "C," a pyrimidine nucleoside; and (4) guanosine, abbreviated "G," a purine nucleoside. FIG. 1 illustrates a short DNA polymer. The short DNA polymer 100, called an oligomer, is composed of the following subunits: (1) deoxy-adenosine 102; (2) thymidine 104; (3) deoxy-cytosine 106; and (4) deoxy-guanosine 108. When phosphorylated, subunits of DNA and RNA molecules are called "nucleotides" and are linked together through phosphodiester bonds 110-115 to form DNA and RNA polymers. A linear DNA molecule, such as the oligomer shown in FIG. 1, has a 5' end 118 and a 3' end 120. A DNA polymer can be chemically characterized by writing, in sequence from the 5' end to the 3' end, the single letter abbreviations for the nucleotide subunits that together compose the DNA polymer. For example, the oligomer 100 shown in FIG. 1 can be chemically represented as "ATCG." A DNA nucleotide comprises a purine or pyrimidine base (e.g. adenine 122 of the deoxy-adenylate nucleotide 102), a deoxy-ribose sugar (e.g. deoxy-ribose 124 of the deoxy-adenylate nucleotide 102), and a phosphate group (e.g. phosphate 126) that links one nucleotide to another nucleotide in the DNA polymer. In RNA polymers, the nucleotides contain ribose sugars rather than deoxy-ribose sugars. In ribose, a hydroxyl group takes the place of the 2' hydrogen 128 in a DNA nucleotide. RNA polymers contain uridine nucleosides rather than the deoxy-thymidine nucleosides contained in DNA. The pyrimidine base uracil lacks a methyl group (130 in FIG. 1) contained in the pyrimidine base thymine of thymidine.

Figure 2:
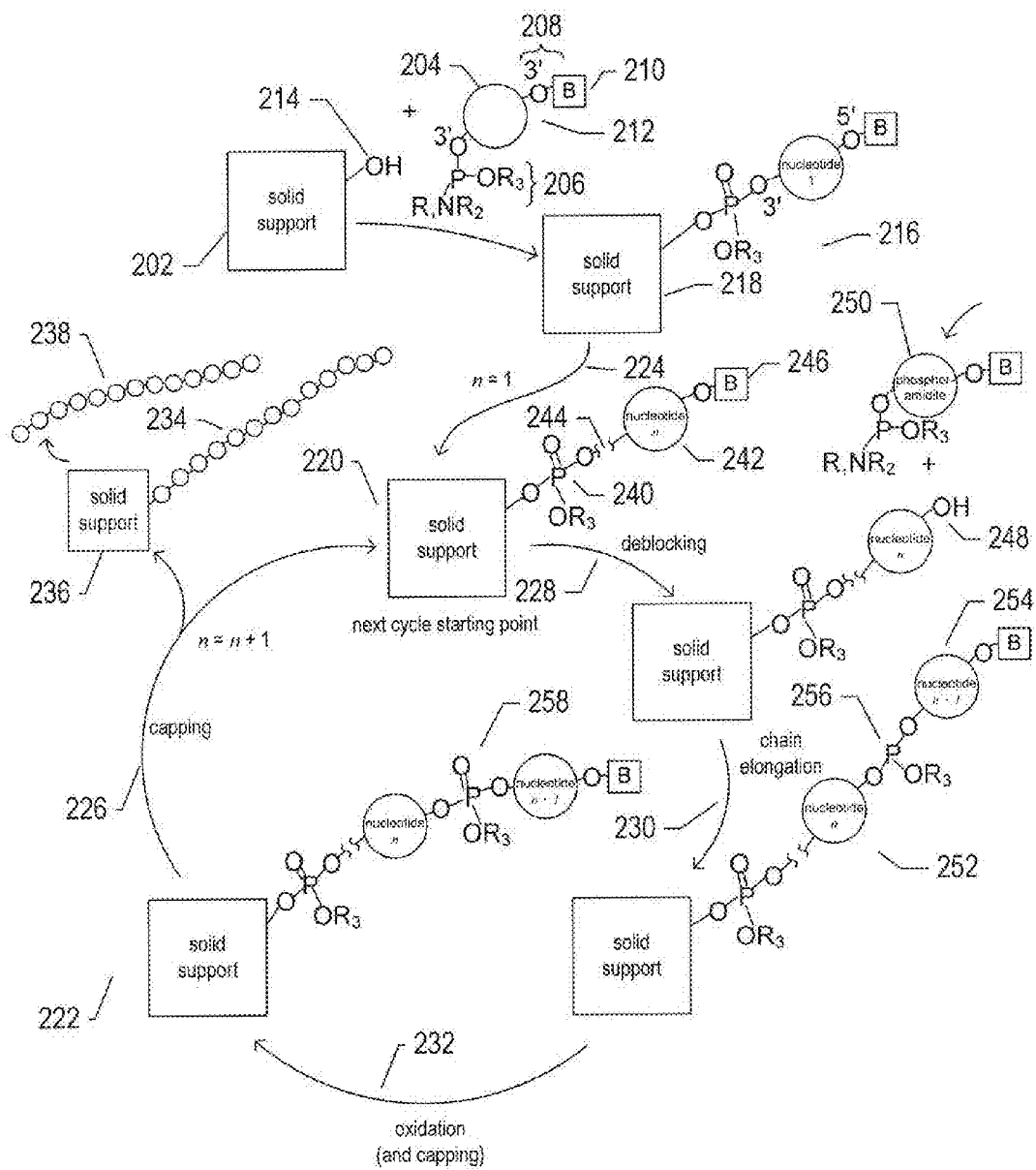
FIG. 2 illustrates a general synthetic scheme for an automated-oligonucleotide-synthesis system.

FIG. 2 illustrates a general synthetic scheme for an automated-oligonucleotide-synthesis system. In FIG. 2, schematic-like illustration features are employed to illustrate the solid support, phosphoramidite monomer, and growing oligonucleotide polymer. The solid support is shown in FIG. 2 as a large rectangle, such as large rectangle 202. Phosphoramidite monomers that are added to growing oligonucleotides during each monomer-addition cycle are each represented by a circle, such as circle 204, with protruding 3' 206 and 5' 208 functional groups. The 3' functional group 206 is an amide of a phosphodiester and the 5' 208 functional group is a hydroxyl group in which a large organic blocking group, represented in FIG. 2 by a small rectangle that includes the label "B" 210 has replaced the hydrogen atom. In an initial step in the synthesis of an oligonucleotide, the first 3' nucleotide is added to the solid support, as shown in FIG. 2, by reacting the corresponding phosphoramidite 212 with a free hydroxyl group 214 extending from the solid support 202. Although only a single hydroxyl group and a single solid support is shown in FIG. 2, in an automated-oligonucleotide-synthesis system, a large number of controlled-pour-glass beads or polystyrene beads, which are derivatized to feature a very large number of accessible free hydroxyl groups, are employed as a collective solid support for oligonucleotide synthesis. Therefore, in any particular reaction chamber, a very large number of individual oligonucleotides of a particular sequence are produced. Furthermore, it is the sequence of particular A, G, T, and C monomers within a DNA oligonucleotide that defines the oligonucleotide's chemical identity. The purpose of automated-oligonucleotide synthesis is to produce, in general, a single type of oligonucleotide having a particular sequence of nucleotides in each reaction chamber. Thus, in this and following descriptions and discussions, it is understood that adding a phosphoramidite to a reaction chamber in order to add a next monomer to the 5' end of a nascent oligonucleotide implies adding the particular phosphoramidite corresponding to the particular monomer to be added to the oligonucleotide. Reaction of the phosphoramidite 212 and the free hydroxyl group 214 of the solid support produces a nascent oligonucleotide 216 bound to the solid support 218. This single-monomer nascent oligonucleotide then serves as the starting point 220 for a first monomer-addition cycle. In all but the first iteration of the monomer-addition cycle, a longer, growing oligonucleotide bound to the solid support 222 becomes the starting point for a next monomer-addition cycle. Thus, arrow 224 represents a special case, in which cyclical monomer addition is initialized, and arrow 226 represents a general case, in which the product of a just-completed monomer-addition cycle becomes the starting point for a next cycle of monomer addition.

The monomer-addition cycle comprises four basic steps represented by arrows 228, 230, 232, and 226. When a final, desired oligonucleotide with n nucleotide subunits has been synthesized by n−1 iterations of the monomer-addition cycle, the completed oligonucleotide 234 is removed from the solid support 236 by addition of a weak acid to generate the final oligonucleotide product 238. In general, various blocking groups render functional groups of the nucleotide subunits unreactive towards reagents used in the monomer-addition cycle and are also cleaved from the final oligonucleotide prior to, or following, removal of the oligonucleotide product from the solid support. In FIG. 2, the nascent oligonucleotide is shown as the 3-terminal phosphate group 240 and the last-added nucleotide 242, with the remaining nucleotides represented by the break 244 in the polymer chain.

In the deblocking step 228, the blocking group 246 is removed from the 5' hydroxyl of the last-added nucleotide to produce a nascent oligonucleotide with a free 5' hydroxyl group 248. Then, in the chain elongation step 230, a next appropriate phosphoramidite 250 is added to the nascent oligonucleotide 248, resulting in the nascent oligonucleotide growing by one nucleotide subunit at the 5' end 254. Note that the terminal nucleotide is connected to the nascent oligonucleotide via a phosphite 256, rather than phosphate, link. In the oxidation step 232, the phosphite link is oxidized to produce a phosphate linkage 258. In a final step of the monomer-addition cycle 226, capping agents are added to render any unreacted substrate hydroxyls or unreacted 5' hydroxyls of nascent oligonucleotides unreactive towards subsequent phosphoramidite additions. This capping step prevents the undesired synthesis of oligonucleotides having fewer nucleotide subunits than the desired oligonucleotide product.

Figure 3:
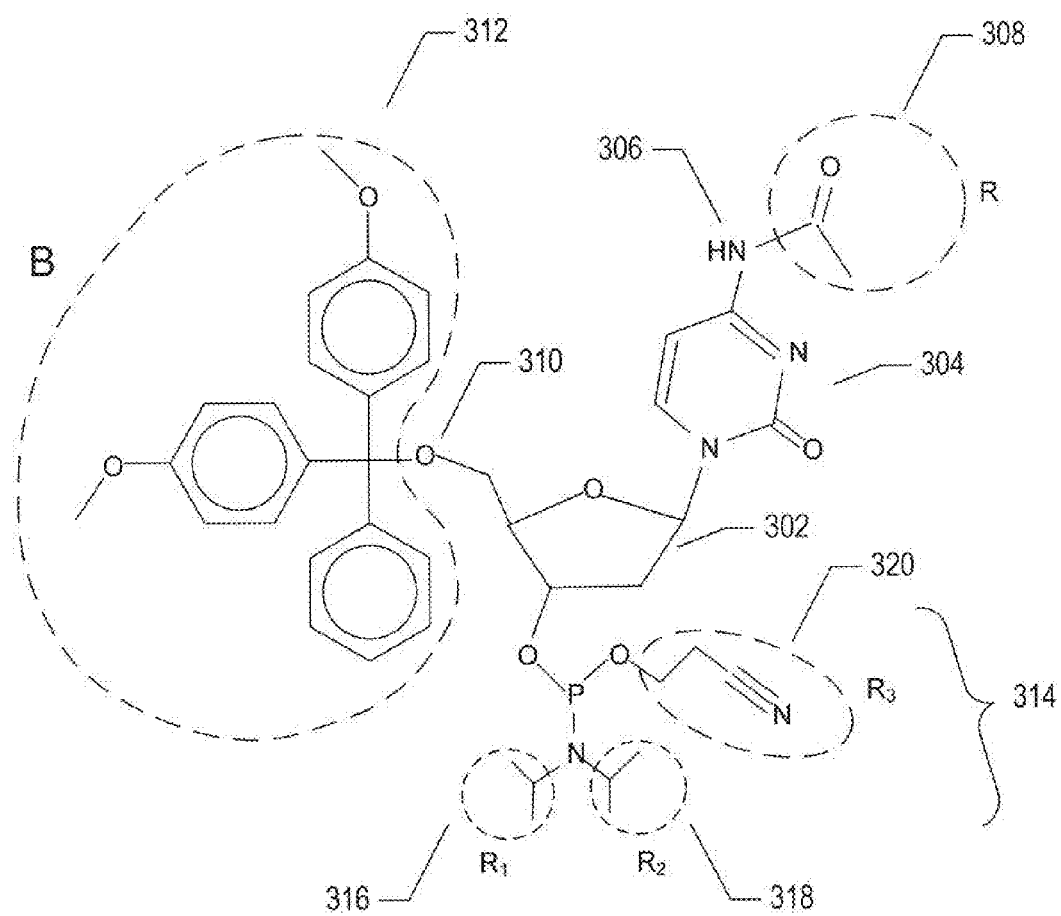
FIG. 3 shows the chemical structure of one particular phosphoramidite reagent used in oligonucleotide synthesis.

FIG. 3 shows the chemical structure of one particular phosphoramidite reagent used in oligonucleotide synthesis. The phosphoramidite shown in FIG. 3 is the phosphoramidite analog of deoxy-cytosine monophosphate. The phosphoramidite shown in FIG. 3 includes a deoxy-ribose moiety 302, a cytosine moiety 304 with the free amino group 306 protected by acetylation 308. The 5' hydroxyl group 310 of the ribose moiety 302 is protected by substitution of hydrogen with a 4,4'-dimethoxytrityl ("DMT") protecting group 312. The phosphodiester amide group 314 includes two isopropyl R groups 316 and 318 as well as a cyanoethyl R group 320.

Figure 4:
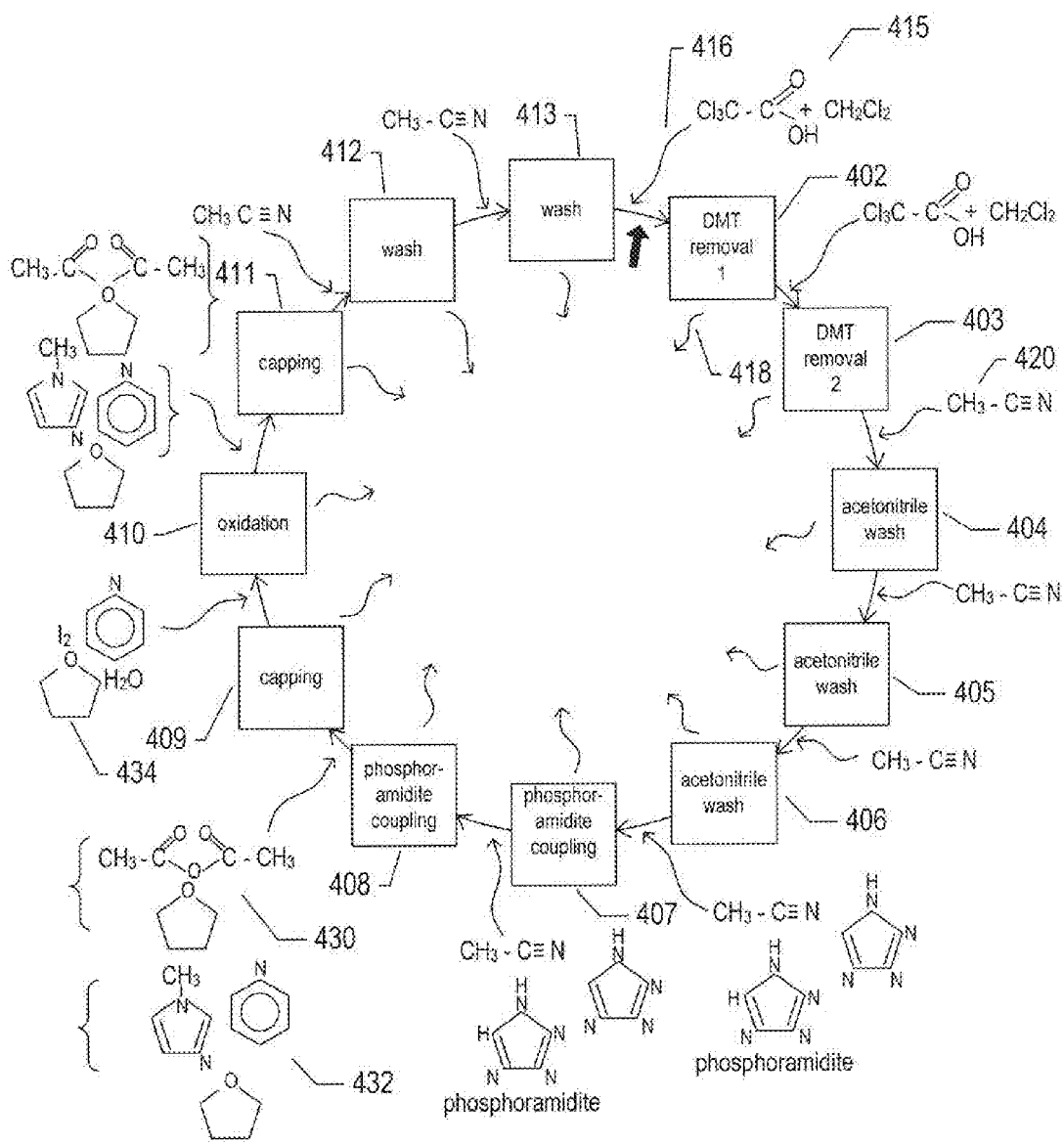
FIG. 4 shows a detailed monomer-addition cycle representative of the monomer-addition cycles used in various automated-oligonucleotide-synthesis systems.

FIG. 4 shows a detailed monomer-addition cycle representative of the monomer-addition cycles used in various automated-oligonucleotide-synthesis systems. The monomer-addition cycle includes 12 steps 402-413. The first two steps 402 and 403 are identical DMT-removal steps corresponding to the deblocking step 228 in FIG. 2. For each DMT-removal step, a mixture of trichloroacetic acid and methylenechloride 415 is added to a reaction chamber including a 5' DMT-protected nascent oligonucleotide attached to a solid support. As indicated by curved arrows in FIG. 4, each step in the monomer-addition cycle involves addition of reagents, such as the addition of trichloroacetic acid and methylenechloride, represented by arrow 416 immediately prior to the first deblocking step 402, and removal of the added reagents, represented by curved arrows, such as curved arrow 418, when the step is completed.

Following DMT removal, the next three steps 404-406 are identical acetonitrile wash steps, in each of which acetonitrile 420 is added to the reaction chamber and then removed. The acetonitrile washing step removes the free DMT and trichloroacetic acid and methylenechloride from the reaction chamber. Next, in two identical coupling steps 407 and 408, an appropriate phosphoramidite in acetonitrile and tetrazole is added to the reaction chamber in order to couple the phosphoramidite to the 5' end of a nascent oligonucleotide. Next, in a first capping step 409, a cap A solution comprising acetic anhydride in tetrahydrofuran 430 and a cap B solution comprising methylimidazole in pyridine and tetrahydrofuran 432 are added to the reaction chamber in order to acetylate any remaining free hydroxyls of the substrate and any free 5' hydroxyls of nascent oligonucleotides. Then, in oxidation step 410, iodine in pyridine, tetrahydrofuran, and water 434 is added to the reaction chamber in order to oxidize the phosphite linkage between the just-added nucleotide and the remaining nascent oligonucleotide to a phosphate linkage. This oxidation step is followed by a second capping step 411 identical to capping step 409. Finally, two wash steps 412 and 413 identical to wash steps 404-406 are carried out to remove any unreacted, coupling, capping, and oxidation reagents in order to produce a clean nascent oligonucleotide bound to a solid support for initiation of a next monomer-addition cycle.

There are many different types of apparatuses and configurations for automatic synthesis of oligonucleotides. For a low-volume automated-oligonucleotide-synthesis system in which embodiments of the present invention are incorporated, the reaction chambers may be small wells within plate-like arrays of wells. Often, 8×12 96-well reaction-chamber plates ("RCPs") are employed, although the dimensions of the arrays can be arbitrarily selected.

Figure 5:
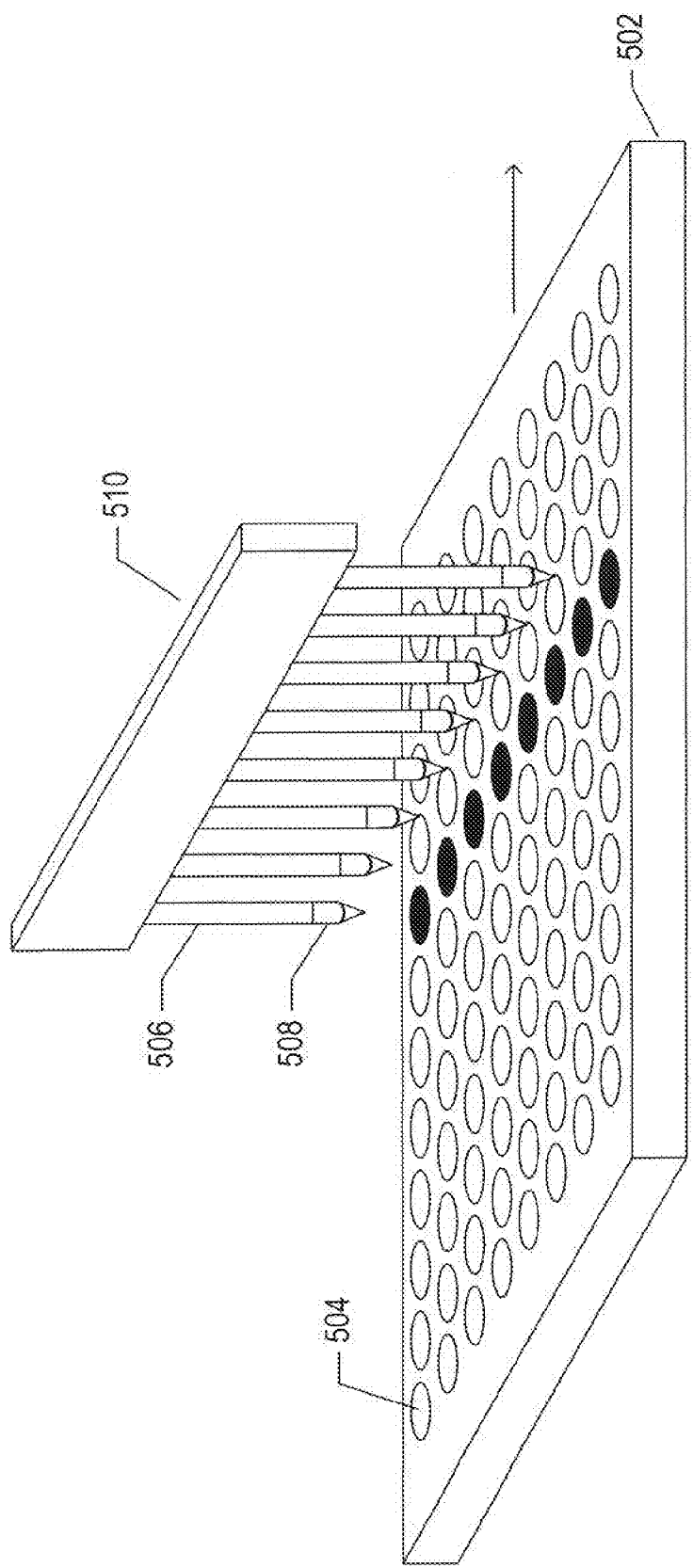
FIGS. 5 and 6 illustrate two general operations involved in automated-oligonucleotide synthesis.
Figure 6:
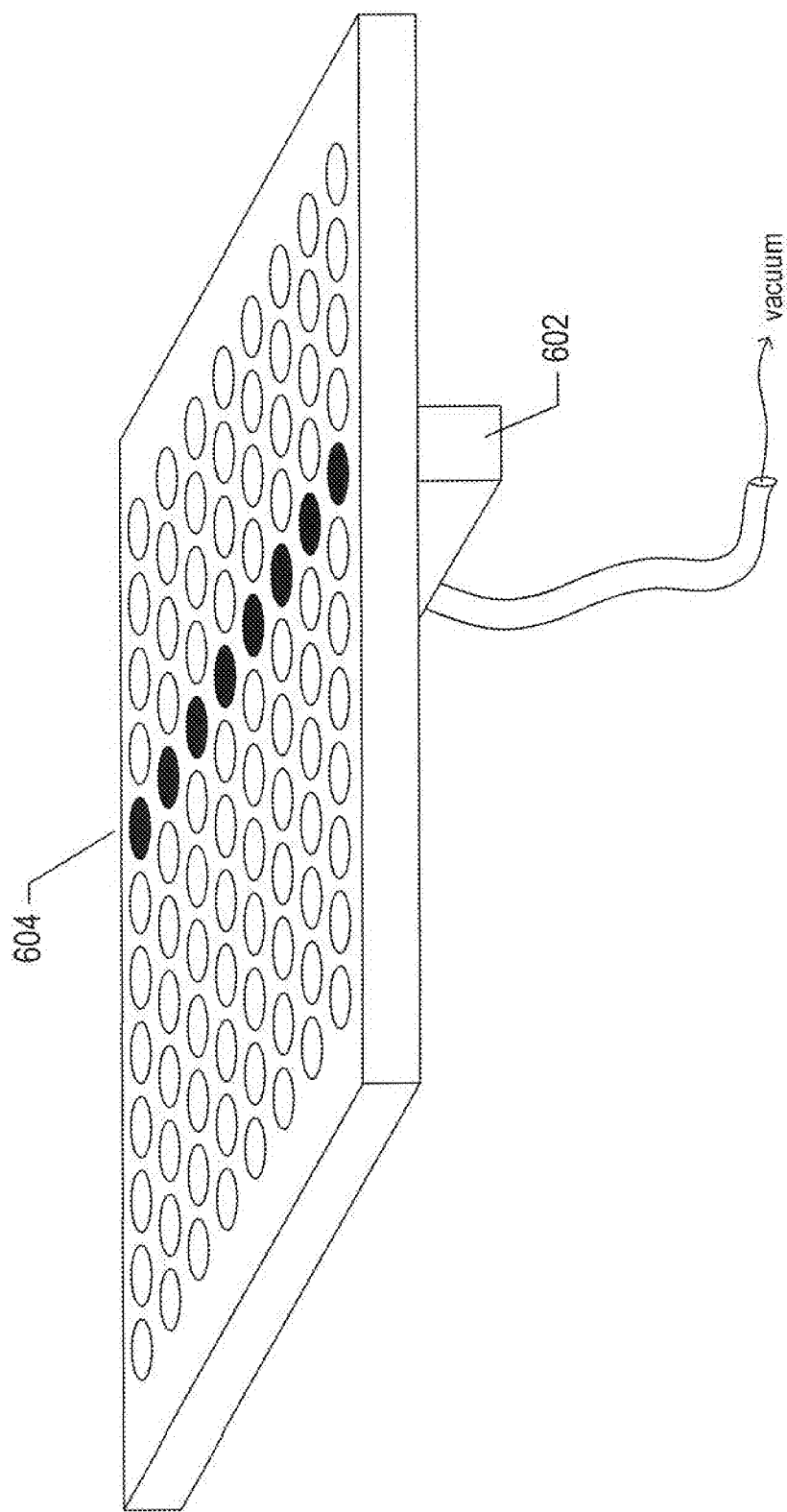

FIGS. 5 and 6 illustrate two general operations involved in automated-oligonucleotide synthesis. These operations include addition of reagents to carry out a next substep, such as the addition of trichloroacetic acid and methylenechloride (416 in FIG. 4) in order to remove the DMT protection group from the 5' hydroxyl of the nascent oligonucleotide, and a reagent-draining or reagent-removal step, such as the removal of the trichloroacetic acid and methylenechloride (418 in FIG. 4) following completion of DMT removal or nascent-oligonucleotide deblocking. As can be seen in FIG. 4, each step of the 12 steps in the monomer-addition cycle involves addition of one or more reagents and/or solvents, a reaction or process that occurs following addition of the one or more reagents and/or solvents, and a reagent-solution removal step.

FIG. 5 shows an RCP 502 containing an array of wells, or reaction chambers, such as well 504. As discussed above, a particular oligonucleotide having a particular monomer sequence is synthesized on a solid support within each of these wells. Thus, RCP 502 may be used to synthesize as many different oligonucleotides as there are well in the RCP. In general, the RCP is moved along a conveyor belt or track, or moved by any of various alternative mechanical methods into positions in which reagents can be added to a row of wells, or reaction chambers, of the RCP. In FIG. 5, an assembly of eight reagent-addition tubes, such as reagent-addition tube 506, each controlled by an electromechanical valve, such as valve 508, is positioned above eight wells of the RCP. In currently-available high-precision systems, the valves are locates at the tips of the tubes. The eight wells directly below the reagent-addition tubes are shaded in FIG. 5. The electromechanical valve of each tube from which reagent is to be added to a well is then activated to add an appropriate amount of the reagent to the well. In certain steps, such as the acetonitrile wash steps 404-406 and 412-413 in FIG. 4, all eight reagent-addition tubes in a reagent-addition-tube assembly positioned above a row of wells may be controlled to add the same amount of reagent to all eight wells in the row. However, in other steps, such as the coupling steps 407 and 408 in FIG. 4, a particular phosphoramidite-coupling solution may be added to only a subset of the wells in a row of wells positioned under the reagent-addition-tube assembly. In general, each reagent-addition tube is entirely devoted to adding a particular reagent solution or solvent to RCP wells. By devoting reagent-addition tubes entirely to a particular reagent solution or solvent, intermediate washing steps are avoided, along with the risk of cross-contamination and the mechanical complexity of routing different types of solutions to a single reagent-addition tube. Therefore, in order to carry out a next step, the RCP is passed under either a single reagent-addition-tube assembly, in the case of steps for which a single reagent solution is added to each well in a row, or passed under four different reagent-addition-tube assemblies for the four different phosphoramidite coupling agents used during the phosphoramidite-coupling step. In one type of automated-oligonucleotide-synthesis system, as an example, RCP 502 may be precisely moved to position each successive row of eight wells under the reaction-addition-tube assembly 510 in order to add a particular reagent solution to all wells of the RCP in order to carry out the reagent-addition portion of a next step of a monomer-addition cycle. For the phosphoramidite-coupling step, each row of wells of the RCP 502 may be precisely positioned under each of four different reaction-addition-tube assemblies so that the appropriate phosphoramidite-coupling solution can be added to each well of the RCP.

It should be noted that an automated-oligonucleotide-synthesis system in generally controlled by a computer or microprocessor. As a result, addition of solution and removal of solution can be controlled at the level of individual wells. A given RCP may be used for synthesis of oligonucleotides of different lengths, with certain reagent-addition and reagent-draining steps omitted for the shorter-length-oligonucleotide-containing wells.

Once the reagent solution and/or solvents used for a next step in the monomer-addition cycle has been completed, the reagent solution and/or solvents generally remain in contact with the nascent oligonucleotides attached to the solid substrate for a period of time. For low-volume automated-oligonucleotide-synthesis systems in which embodiments of the present invention are incorporated, the reaction times range from 15 seconds to a minute or more, with 30 seconds considered to be, in certain cases, an average reaction time. Spent and unreacted reagents and reaction products, other than the nascent oligonucleotides still covalently attached to the solid substrate, are then drained from the reaction chamber or wells. In certain cases, the nascent oligonucleotides, solid support, and wells are washed in acetonitrile or other solvents, and the wash solvent is then drained to ensure removal of spent and unreacted reagents and reaction products from the reaction chamber and solid substrate. As shown in FIG. 6, draining of the reaction chambers, or wells, is traditionally carried out by applying a pressure differential, often through vacuum suction, to the reaction chambers in order to remove solution from the reaction chambers. In FIG. 6, a pressure-differential-applying and solution-draining assembly 602 is positioned beneath the row of wells 604 to which reagent solutions were added by the reagent-addition-tube assembly, in FIG. 5, to remove the added reagent solutions following the appropriate wait time or wait period.

Figure 7A:
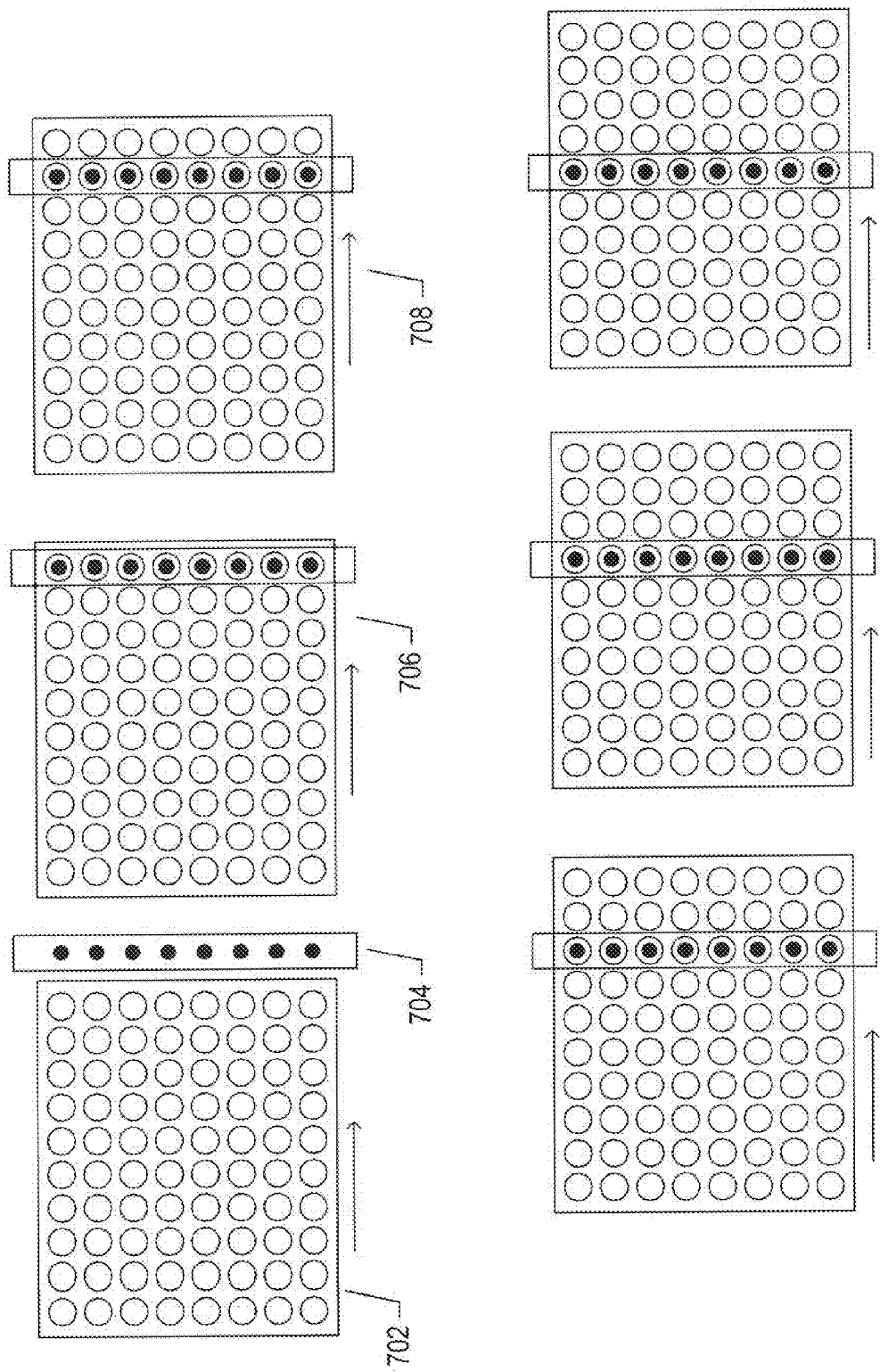
FIGS. 7A-B illustrate two different approaches to automated addition of reagent solutions to rows of wells within an RCP during automated-oligonucleotide synthesis.
Figure 7B:
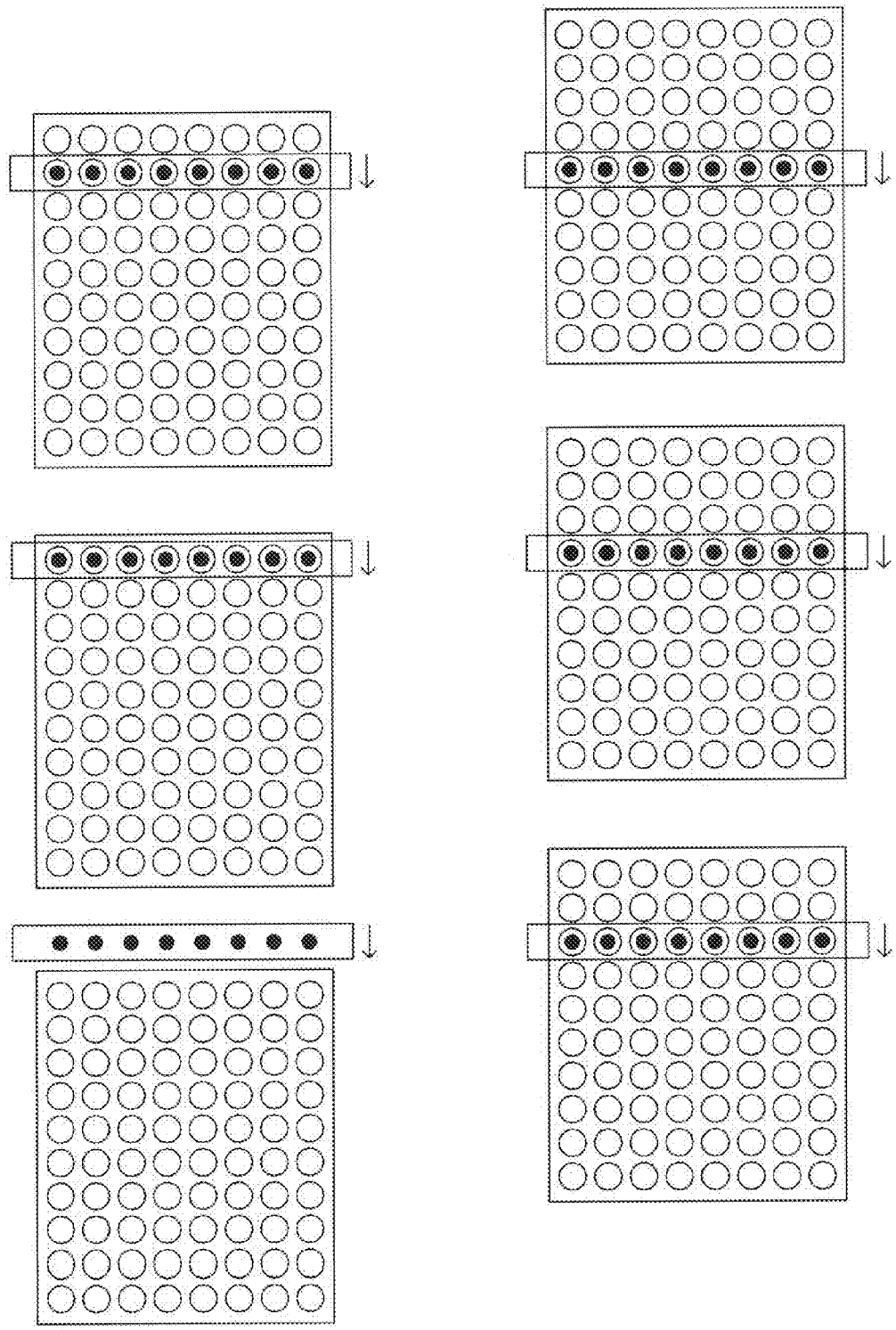

There are many different ways to design and configure electromechanical subcomponents, within an automated-oligonucleotide-synthesis system, for adding reagent solutions to reaction chambers and removing reagent solutions from reaction chambers. FIGS. 7A-B illustrate two different approaches to automated addition of reagent solutions to rows of wells within an RCP during automated-oligonucleotide synthesis. In FIG. 7A, an RCP 702 is moved, on a surface of electromechanically driven rollers, a chain-driven conveyer, a belt-driven conveyor, or by some other electromechanical means, toward a reagent-addition-tube assembly 704, such as that shown in FIG. 5, for addition of reagents to the wells of the RCP as the initial substep in a next step of the monomer-addition cycle. As shown in FIG. 7A, the RCP is first positioned with a first row of wells below the reagent-addition-tube assembly 706, and the electromechanical valves are activated to introduce precise volumes of a reagent solution into each of one or more selected wells. Then, the RCP is moved forward in order to place a second row of wells below the reagent-addition-tube assembly 708. This process continues, row-by-row, until the reagent solution is added to each of a predetermined set of wells within the RCP. By this method, the reagent-addition-tube assembly is essentially stationary, while the RCP is moved precisely to align rows of wells with the reagent-addition-tube assembly. In a different method, illustrated in FIG. 7B, the RCP remains stationary while the reagent-addition-tube assembly is moved to align the reagent-addition tubes with successive rows of wells. In the technique shown in FIG. 7B, the reagent-addition-tube assembly is moved in a direction parallel to the direction in which the RCPs are moved along a conveyor belt or other mechanical-transport assembly into an area in which the reagent-addition-tube assembly will be precisely moved in order to add reagents to wells. Alternatively, the reagent-addition-tube assembly may be moved across the RCP in a direction orthogonal to the direction in which the RCP is moved within the automated-oligonucleotide-synthesis system.

Figure 8:
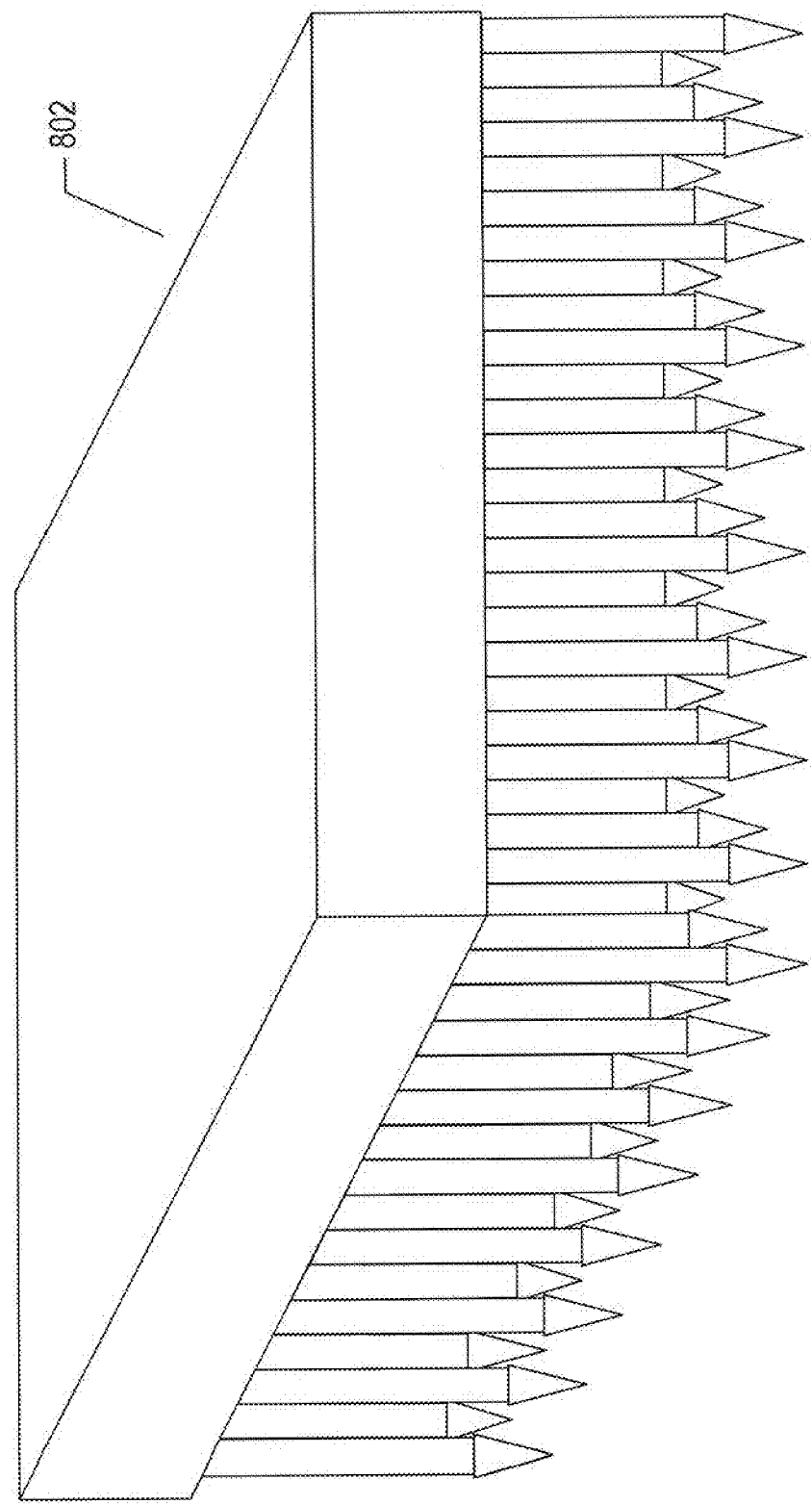
FIG. 8 illustrates an 8×10 reagent-addition-tube assembly used in certain types of automated-oligonucleotide-synthesis systems.

Reagent-addition-tube assemblies and reagent-removal assemblies can have many different implementations. As discussed above, it is generally important that a particular reagent-addition tube and valve system transports only a single type of reagent solution into reaction chambers. Thus, at least one reagent-addition tube and valve system is needed for each of the different reagent solutions and solvents added to reaction chambers during the initiation phase, cyclic monomer-addition phase, and termination phase of automated-oligonucleotide synthesis. In certain systems, there are 10 different reagent solutions used during oligonucleotide synthesis. The number of reagent solutions and solvents may vary, depending on the exact chemistry employed to synthesize oligonucleotides. Thus, at a minimum, at least ten valve-controlled reagent-addition tubes are needed for a system that employs ten different reagent solutions and solvents. However, to increase throughput and simplify mechanical operation, it is convenient to dedicate a number of valve-controlled reagent-addition tubes equal to the length of a row of wells in an RCP to each different reagent solution. In the case illustrated in FIGS. 5-7B, the RCP has rows containing eight wells, and thus eight valve-controlled reagent-addition tubes are together incorporated within a single reagent-addition-tube assembly that can mechanically scan through the rows of the RCP. The reagent-addition-tube assemblies may be discrete, column-like assemblies for each of the different reagent solutions, as shown in FIGS. 7A-B. Alternatively, the rows of valve-controlled reaction-addition tubes can be incorporated into a single 8×n reaction-addition tube assembly, where n is the number of different reagent solutions and solvents used during the oligonucleotide-synthesis process. FIG. 8 illustrates an 8×10 reagent-addition-tube assembly used in certain types of automated-oligonucleotide-synthesis systems. This 8×10 reagent-addition-tube assembly 802 can be mechanically controlled to position a selected row of eight valve-controlled reagent-addition tubes, dedicated to a particular reagent solution, above a selected row of eight wells of an RCP. In yet additional types of automated-oligonucleotide-synthesis systems, a single high-speed valve-controlled reagent-addition tube can be employed to add a particular reagent solution to all of the wells of an RCP to which the reagent solution is to be added using a two-dimensional raster-like scanning mechanism for positioning the single valve-controlled reagent-addition tube over selected wells.

The wells, or reaction chambers, RCPs are roughly hemispherical or cylindrical vessels containing a matrix of solid-substrate beads or particles within a porous, polymeric network. For example, the solid-substrate can be controlled-pour-glass beads or polystyrene beads that provide relatively large surface areas, per bead volume, for covalent attachment of nascent oligonucleotides. The controlled-pour-glass or polystyrene beads are mixed with a polymer resin or slurry to form a solid-substrate-containing porous, polymer network referred to as a "fit." The frit is generally positioned at the bottom of a well, above and within a small aperture in the bottom of the well through which reagent solutions can be drained by application of a pressure differential across the reaction chamber. In certain systems, small tubes or capillaries, with frits positioned at the bottom of the tubes or capillaries, are used as reaction chambers.

In relatively large-volume automated-oligonucleotide-synthesis systems, application of a pressure differential across relatively large-volume reaction chambers provides a moderately effective means for draining reagents from reaction chambers. However, this mechanism does not scale well to low-volume oligonucleotide-synthesis systems. Comparatively large pressure differentials need to be applied to smaller-volume reaction chambers in order to overcome adhesion of reagent solutions and solvents to the walls of the reaction chambers and the frits and to overcome the surface tension of the reagent solutions and solvents in order to force the reagent solutions and solvents out through the bottom of the reaction chambers. These large pressure differentials tend to compress the matrix and render the frits less and less porous, over time, requiring even larger pressure differentials which, in turn, even further compress the matrix material. Furthermore, in any chemical system, there is a certain percentage of the reagent solutions that cannot be removed by applying a pressure differential. The fraction of solution that cannot be removed is often proportional to the surface area of the reaction chamber and frit components, in the case of automated-oligonucleotide-synthesis systems. In low-volume reaction chambers, the ratio of surface area to volume is relatively greater than in large-volume reaction chambers, so that a relatively larger fraction of the reagent solution in low-volume reaction chambers is not amenable to pressure-differential-based removal.

Embodiments of the present invention are directed to overcome the limitations and deficiencies of pressure-differential-based solution removal during automated synthesis of biopolymers and synthetic polymers and, in particular, during automated synthesis of oligonucleotides. Embodiments of the present invention employ wicking, or capillary action, to draw reagent solutions and solvents from reaction chambers rather than employing traditional pressure-differential-based methods. A functional wicking-based reagent-removal mechanism removes much of the reagent solution from the reaction chamber as possible without compressing the frit matrix and without experiencing degradation of the wicking components due to the corrosive nature of certain of the reagents and solvents used during oligonucleotide synthesis.

FIGS. 9A-B illustrate an individual reaction chamber, or well, used in a low-volume automated-oligonucleotide-synthesis system that represents one embodiment of the present invention. FIG. 9A shows the well within a small surrounding volume of a reaction-chamber plate 902. The well 904 has a roughly cylindrical volume, with tapered sides, and is open at the upper surface 906 of the RCP. There is a small aperture 908 at the bottom of the well, with an aspect ratio, or radius-to-height ratio, greater than 1.0. The aperture opens into a shallow concave impression in the underside of the RCP 909. FIG. 9B shows the well, or reaction chamber, shown in FIG. 9A in an alternative, cross-section view. In FIG. 9B, the cross-section of the volume occupied by the frit 910 is shown cross-hatched. As described above, reagent solutions are dropped into the well at the beginning of each substep of oligonucleotide synthesis, and, after remaining in the well for a particular period of time, referred to as the "wait time" or "wait period," the reagent solution is drained through the aperture at the bottom of the well.

Figure 10A:
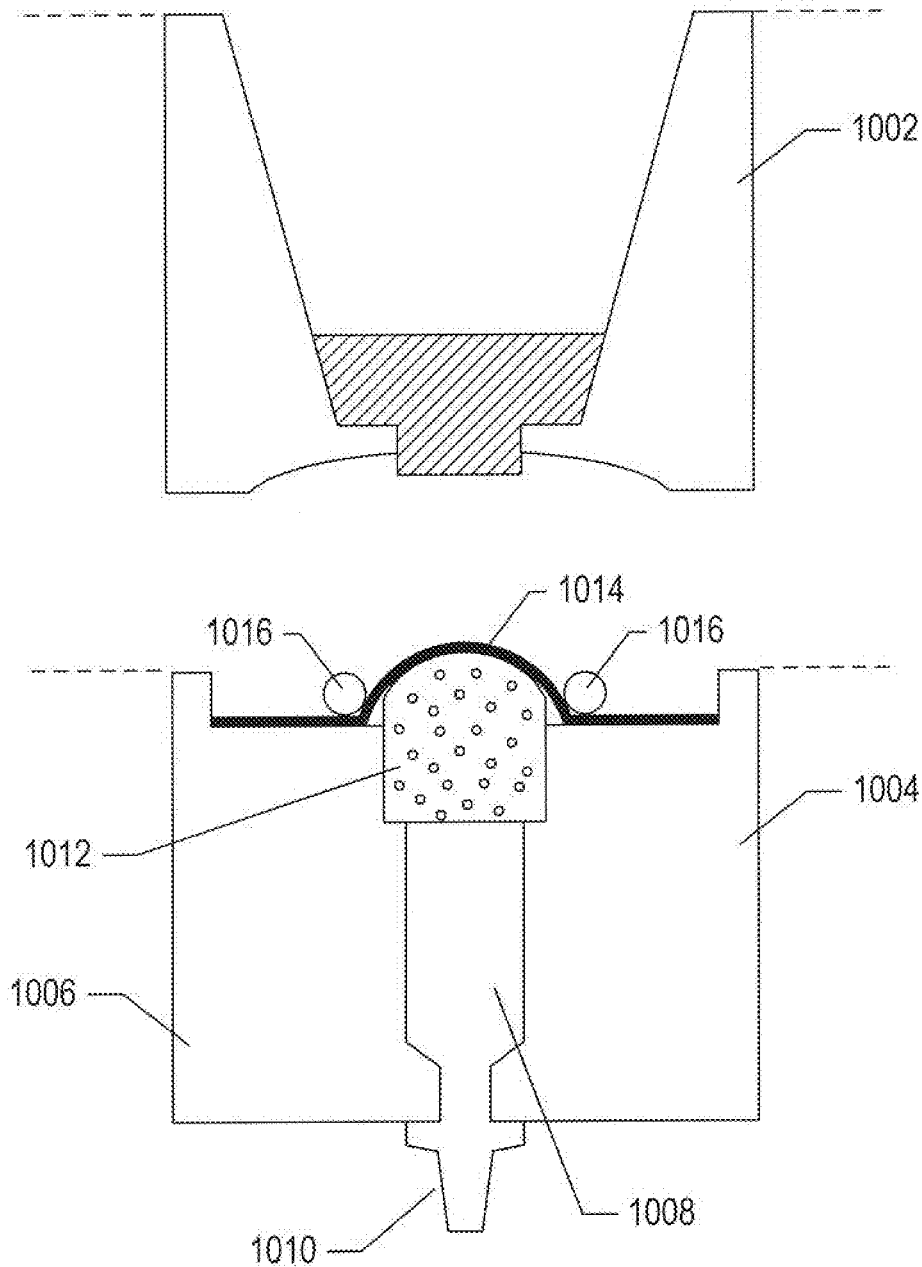
FIGS. 10A-B illustrate a reagent-solution-removal subcomponent, or assembly, within an automated-oligonucleotide-synthesis system that represents an embodiment of the present invention.
Figure 10B:
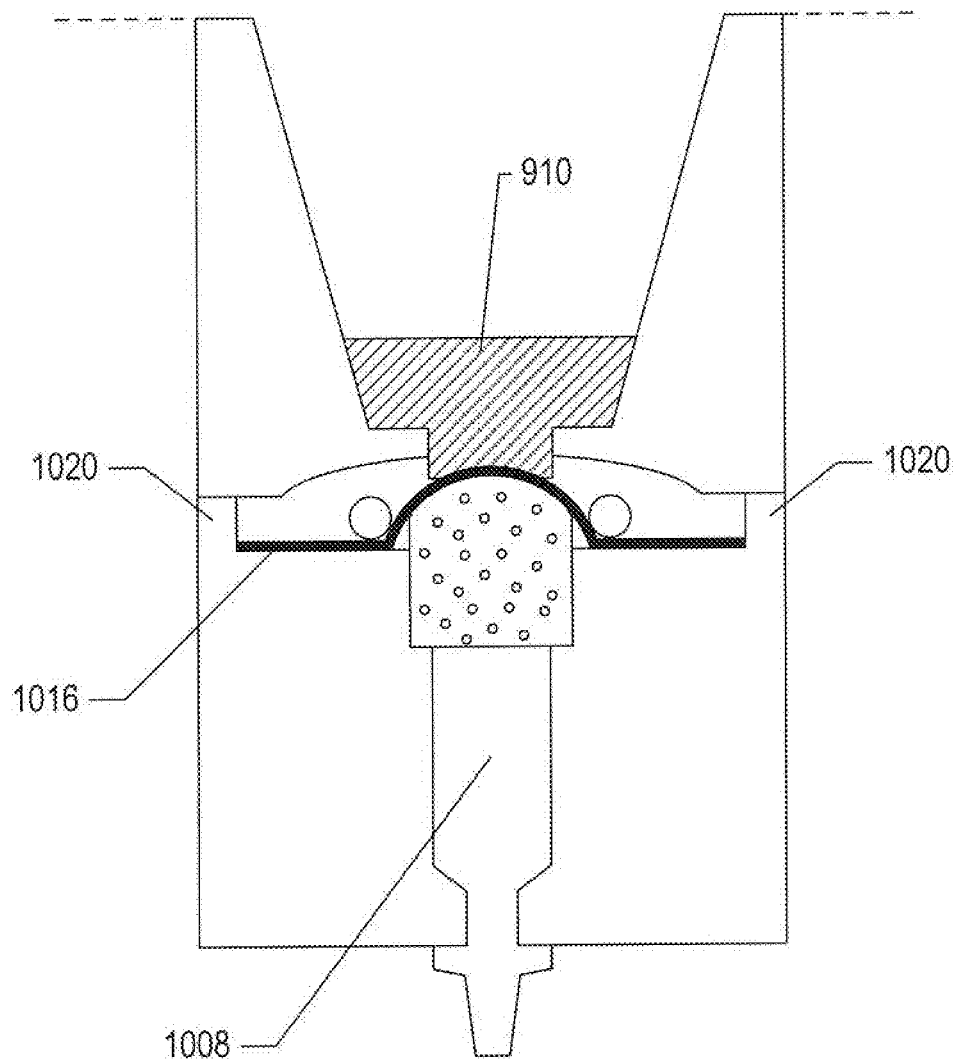

FIGS. 10A-B illustrate a reagent-solution-removal subcomponent, or assembly, within an automated-oligonucleotide-synthesis system that represents an embodiment of the present invention. An RCP containing multiple reaction chambers, or wells, including the reaction chamber 1002 shown in FIG. 10A, is positioned within a reagent-solution-removal component or position. In this component or position, the bottom portions of the RCP below all or a portion of the reaction chambers in the RCP is exposed to a reagent-solution-draining assembly 1004. A well is shown positioned over the reagent-solution-draining assembly, without the reagent-solution-draining assembly contacting the RCP and well, as shown in FIG. 10A. The reagent-solution-draining assembly 1004 includes a mechanical body 1006 that can be moved at least in the vertical direction. A waste-removing chamber 1008 with an exposed tip 1010 extends downward through the body of the reagent-solution-draining assembly. A vacuum line or drain line can be removably affixed to the exposed tip. A porous, relatively rigid, hemispherically shaped cap 1012 is fitted above the reagent-draining chamber 1008 and a relatively compliant wicking medium 1014 is mounted above, and partially in contact with, the porous cap 1012. In certain embodiments of the present invention, the wicking medium is clamped to the upper surface of the reagent-solution-draining assembly by a curved or circular clamp, shown in cross-section 1016 in FIG. 10A. The wicking medium 1014 can be composed of any of many different types of absorbent materials, including relatively compliant materials, including non-woven fabrics, paper, sponge-like materials, and soft plastics or more rigid materials, including woven fabrics, rigid plastics, and sintered materials. In one embodiment of the present invention, a polypropylene felt is employed. Other types of porous wicking media, including paper, glass-fiber filter-membrane materials, porous plastic materials, sheets of synthetic or natural polymeric materials, and many other types of absorbent materials can be employed. Examples include polyethylene, polyfluoroethylene, nylon, polyesters, and other synthetic polymers, chosen depending on their absorbance for the particular solutions that need to be drained. Natural-fiber examples include cotton, wool, and other natural materials. Polypropylene felt and other types of synthetic polymeric materials are particularly desirable due to their relative chemical inertness. In the embodiment shown in FIGS. 10A-B, the wicking material is a planar sheet, with a thickness varying from less than one to several millimeters, and may be thicker or thinner for particular applications.

Once the RCP and well are properly positioned with respect to the reagent-solution-draining assembly, the reagent-solution-draining assembly is moved vertically in order to contact the bottom of the reaction chamber, as shown in FIG. 10B. Note that, as shown in FIG. 10B, the wicking medium 1014 is pushed slightly into the frit material 910 that protrudes slightly below the lower surface of the RCP. Alternatively, the wicking material may be slightly pushed into the aperture to contact the frit material. The reagent-solution-draining assembly has one or more lips 1020 that contact the base of the RCP to ensure that the contact between the wicking medium and porous cap below the wicking medium with the frit within the reaction chamber produce insufficient vertical force to disturb or displace the frit material. These lips also serve to constrain solvents used to wash the wicking material after solution-draining operations. The reagent-solution-draining assembly may be mounted to a spring or elastic material to ensure that the force of contact between the wicking material and frit is constrained to remain below a threshold minimal force that could damage the frit material or reaction chamber. More often, the entire assembly is precisely controlled by pneumatic or other means to prevent potentially harmful contact forces between the wicking material and the frits. The reagent-solution-draining assembly is held in the position shown in FIG. 10B for sufficient time to drain the reagent solution from the reaction chamber, including from the porous frit material. Often, the time needed to drain a sufficient amount of reagent solution from the reaction chamber ranges from 3 to 15 seconds. The reagent solution is initially absorbed through the wicking material 1014, but then, over time, is pulled through the porous cap into the draining chamber 1008 by a combination of capillary action and, in certain embodiments, a pressure differential applied from below to the reagent-draining chamber. The pressure differential is not, however, applied to the reaction chamber or frits, and is applied only to remove solvent and reagent solution from the wicking material. In order to maintain the wicking material in a chemically clean state, the wicking material may be washed by an acetonitrile-depositing valve-controlled tube, such as those described with reference to FIG. 5, at points in time when there is no RCP and reaction chamber positioned above the reagent-solution-draining assembly. In many embodiments of the present invention, a single reagent-solution-draining assembly can be employed to drain all of the reagent solutions used during oligonucleotide synthesis. However, in alternative embodiments, multiple reagent-draining assembles can be employed to drain particular reagent solutions in the case that it is found that even slight amounts of drained reagent solutions remaining in the wicking material and inadvertently exchanged with the frit material during reagent-draining operations may deleteriously affect subsequent synthetic steps. In certain embodiments, a compliant layer of wicking material is omitted, with the capillary action provided entirely by the porous cap.

Figure 11:
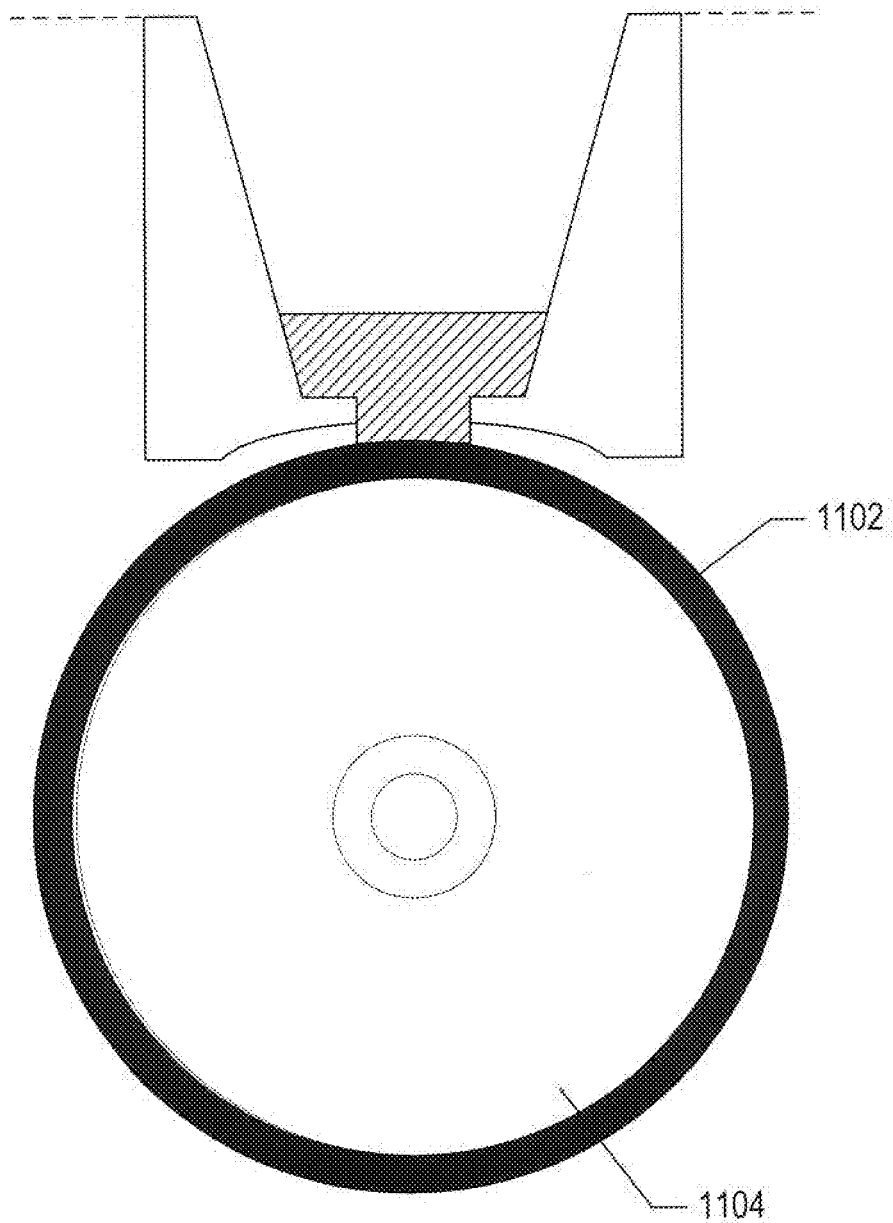
FIG. 11 illustrates an alternative embodiment of the present invention.

FIG. 11 illustrates an alternative embodiment of the present invention. As shown in FIG. 11, rather than employing an essentially flat layer of wicking material above the porous cap and reagent-draining chamber, as shown in FIG. 10B, a continuous cylindrical layer of wicking material 1102 is mounted to a rotatable drum or cylinder 1104 onto which RCPs and reaction chambers can be moved to carry out draining. After each reagent-draining operation, the rotatable drum is rotated to place a next portion of the wicking material in a vertical position. The rotatable drum may also be connected to a vacuum source and drain system to remove solution from the wicking medium. The rotatable drum may be positioned within a washing reservoir or sprayed with a washing solution in order to clean portions the wicking material previously used to drain reagents from a reaction well and then rotated away from the vertical position. Alternatively, the reagent solutions drained into the wicking material may evaporate or dissipate during the time that the wicking material rotates back into a vertical position to again be used for draining solutions.

Figure 12:
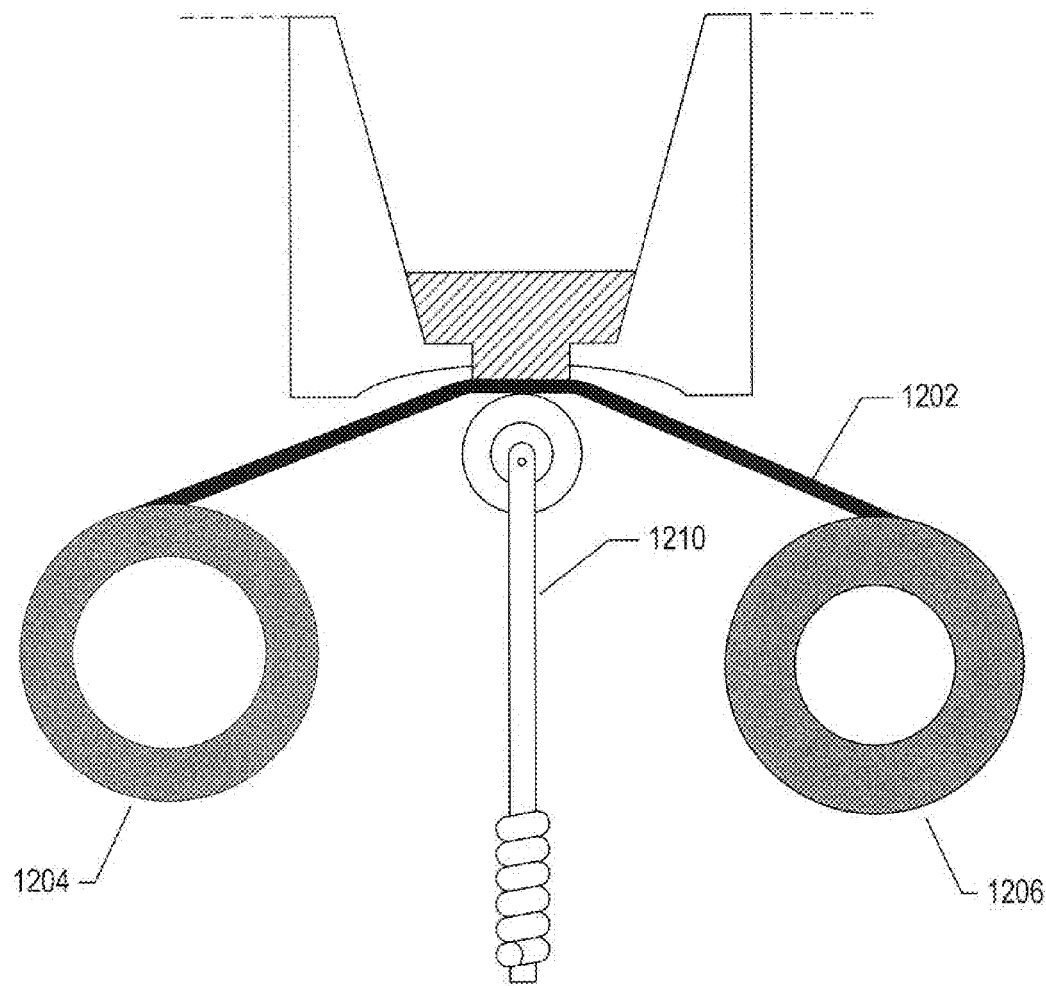
FIG. 12 illustrates a second alternative embodiment of the present invention.

FIG. 12 illustrates a second alternative embodiment of the present invention. In this embodiment, the wicking material 1202 is mounted to rotatable reels 1204 and 1206 that can be used, much like magnetic-tape reels, to feed the wicking material across a central roller head in order to expose certain portions of the wicking material to reagent solution during successive reagent-solution-draining steps. In this embodiment, a spring-loaded central roller head 1210 positions the wicking material in contact with the frit material of a reaction chamber in order to drain the reaction chamber. Alternatively, pneumatic control can be employed. In both embodiments shown in FIGS. 11 and 12, the rotatable drum or roller head may be vertically lowered and raised, between reagent-draining operations, or may be stationary, with the RCP translated past the rotatable drum or head to place successive rows of wells in contact with the wicking material.

Figure 13:
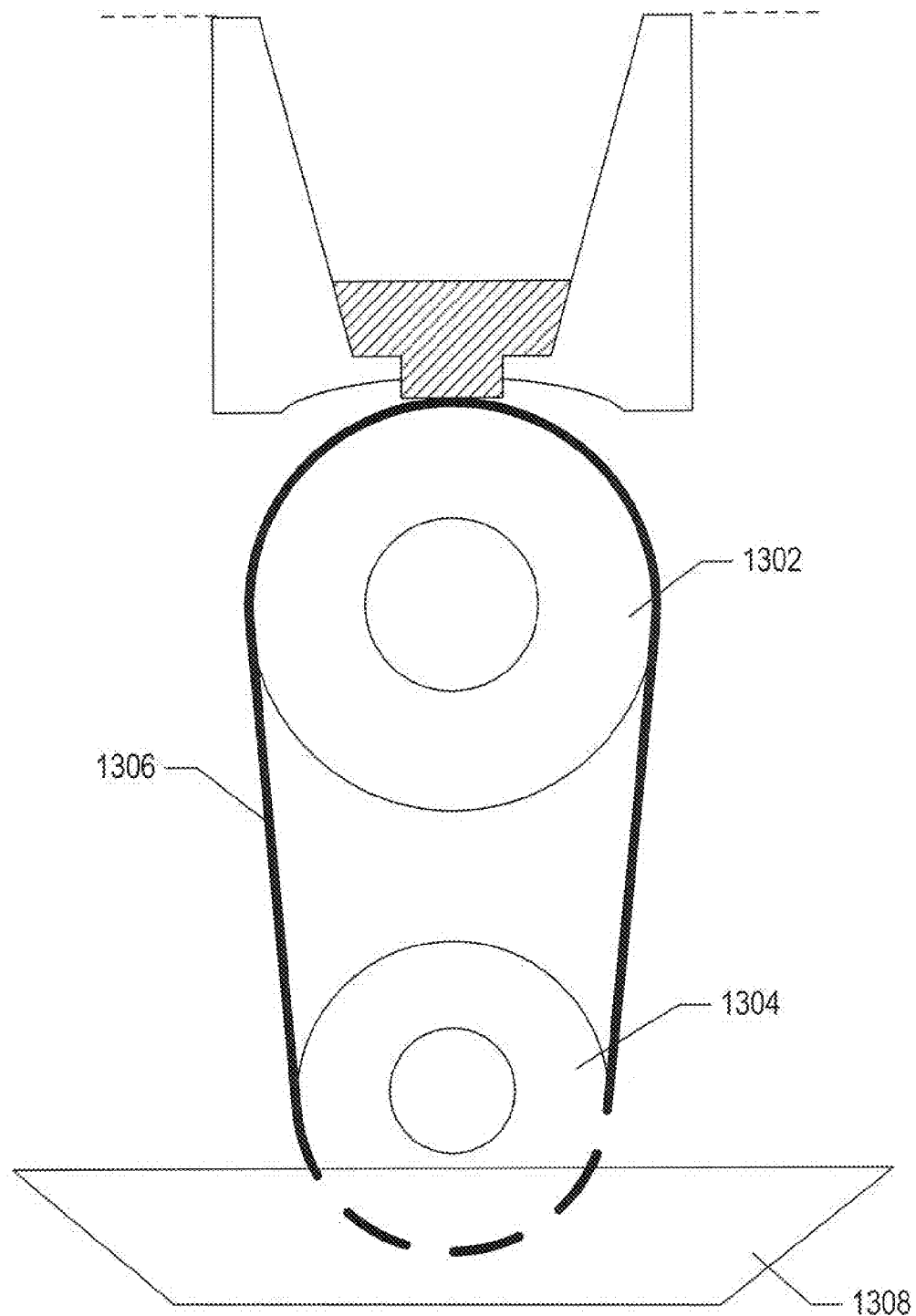
FIG. 13 a third alternative embodiment of the present invention.

FIG. 13 a third alternative embodiment of the present invention. In this embodiment, the reagent-solution-draining assembly includes two rotatable drums 1302 and 1304 upon which a continuous circular sheet of wicking material 1306 is rotatably mounted. The entire assembly can be moved vertically in order to place the wicking material in contact with the frit material of a reaction chamber in order to drain reagent solution from the reaction chamber and lowered to allow translation of the RCP forward or backward in order to expose successive rows of reaction chambers to the reagent-solution-draining assembly. Alternatively, the reagent-solution-draining assembly can remain stationary, relying on motion of the RCP to place the frit material on successive rows of reaction chambers in contact with the wicking material. In the embodiment shown in FIG. 13, the wicking material is continuously run through a washing solution in a washing-solution reservoir 1308 at the bottom of the reagent-solution-draining assembly.

Figure 14:
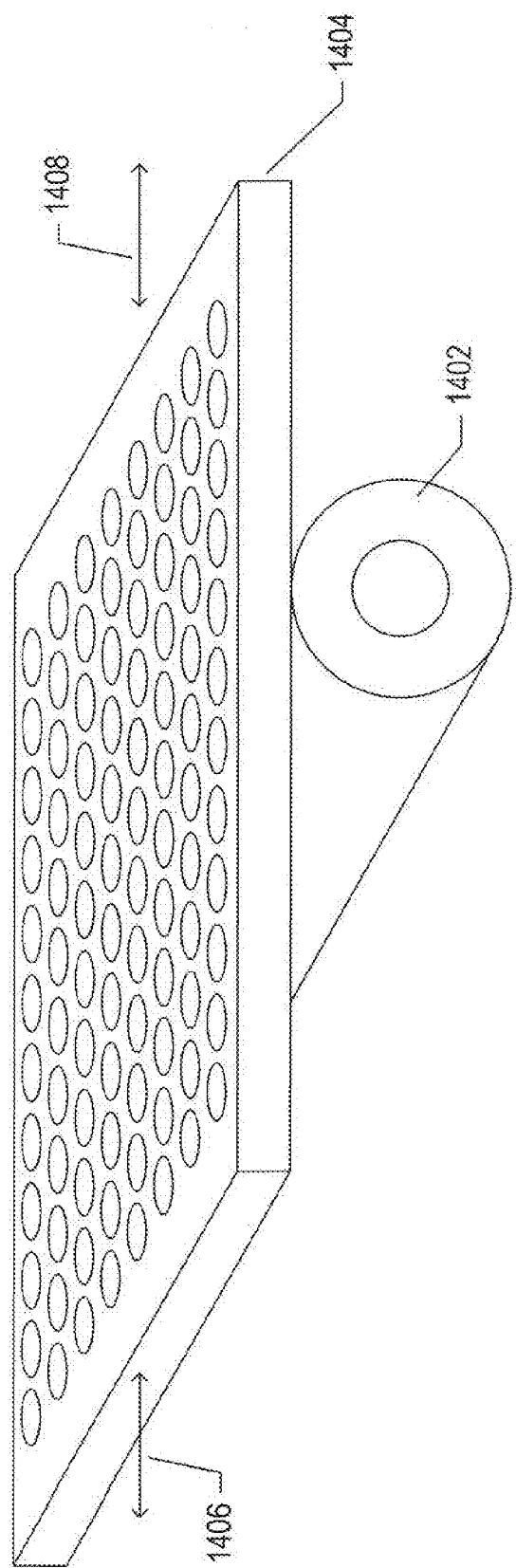
FIG. 14 illustrates a wicking-based reagent-solution-draining assembly that represents an embodiment of the present invention.

FIG. 14 illustrates a wicking-based reagent-solution-draining assembly that represents an embodiment of the present invention. As shown in FIG. 14, a rotatable drum, onto which a continuous sheet of wicking material is mounted 1402, is positioned below an RCP 1404 containing 80 reaction chambers, or wells. As the RCP is translated forward or backward in the directions indicated by arrows 1406 and 1408, the surface of the wicking material can be simultaneously placed in contact with the frit material at the bases of an entire row of wells, or reaction chambers. As in the case of valve-controlled reagent-addition-tube assembles, multiple rows of reaction chambers may be simultaneously accessed by multiple reagent-draining assemblies. For example, in one embodiment, a large reagent-solution-draining assembly may contain an array of porous-capped reagent-draining chambers, such as that shown in FIG. 10A, that can concurrently drain all of the wells of an RCP following a single positioning operation.

Although the present invention has been described in terms of particular embodiments, it is not intended that the invention be limited to these embodiments. Modifications will be apparent to those skilled in the art. For example, although numerous different embodiments are illustrated in FIGS. 10A-14 and discussed above, there are many more additional types of electromechanical reagent-solution-draining assemblies that can be employed to place a wicking medium in contact with an aperture or with a frit at the bottom of a reaction chamber in order to drain reagent solutions from the reaction chamber as an automated step in an automated-biopolymer-synthesis system. As discussed above, any of many different types of wicking media, with different thicknesses and compositions, can be employed for reagent draining and automated-biopolymer-synthesis systems. The reagent-draining process can be accompanied by separate wicking-medium cleaning steps, carried out after each draining operation, at regular intervals, or on an as-needed basis. In addition, the wicking medium may be continuously or periodically subjected to vacuum suction, an air stream, or other conditions to remove reagent solutions and solvents from the wicking medium.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A solution-draining component within an automated-polymer-synthesis system, the solution-draining component comprising:
    a wicking medium; and
    a mechanical assembly, to which the wicking medium is mounted, first controlled to place the wicking medium in contact with a solution within a reaction chamber in order to draw the solution by wicking action from the reaction chamber into the wicking medium and that is then controlled to remove the wicking medium from contact with the solution within the reaction chamber;
    wherein the mechanical assembly is vertically raised in order to position the wicking medium in contact with the solution within the reaction chamber at the onset of a solution-draining operation; and
    wherein the mechanical assembly includes a waste-removing chamber with an exposed tip that extends downward through the body of the solution-draining assembly to which a vacuum line or drain line can be removably affixed, the waste-removing chamber covered by a porous, hemispherically-shaped cap, above which the wicking medium is mounted.

2. The solution-draining component of claim 1 wherein the wicking medium is a layer of solution-absorbing material that is chemically unreactive towards the solution.

3. The solution-draining component of claim 1 wherein the wicking medium is selected from among:
    a compliant material, such as a sponge, felt, soft plastic, non-woven material, or paper; and
    a woven material, rigid plastic, sintered material.

4. The solution-draining component of claim 1 wherein the wicking medium is selected from among:
    polypropylene felt;
    a synthetic-polymer-based material, including polypropylene, polyethylene, polyfluoroethylene, polyester, nylon, and other synthetic-polymer-based materials;
    a natural biopolymer material, including cellulose, wool, cotton, and other natural materials;
    paper;
    a glass-fiber filter membrane; and
    a porous plastic material.

5. The solution-draining component of claim 1 wherein the solution is one of:
    a reagent solution added to the reaction chamber to imitate a chemical-reaction step of a polymer-synthesis protocol;
    a solvent or solvent solution added to the reaction chamber to wash a nascent polymer and a solid substrate to which the nascent polymer is bound in preparation for carrying out a subsequent chemical-reaction step of a polymer-synthesis protocol.

6. The solution-draining component of claim 1 wherein the wicking medium is cylindrically formed and mounted to a rotatable cylindrical drum that is rotated following a solution-draining operation to expose a next portion of the wicking medium in a vertical position in preparation for a subsequent solution-draining operation.

7. The solution-draining component of claim 1 wherein the wicking medium is fed from a first reel over a roller head to a second reel, the roller head positionable to place the wicking medium in contact with the solution within the reaction chamber.

8. The solution-draining component of claim 1 wherein the mechanical assembly is statically positioned so that, when a reaction chamber is moved into a draining position, the wicking medium contacts the solution within the reaction chamber.

9. The solution-draining component of claim 1 wherein the wicking medium is mounted above the porous, hemispherically-shaped cap by a by a curved or circular clamp.

10. A reagent-solution-removal subcomponent of an automated-oligonucleotide-synthesis system, the reagent-solution-removal subcomponent comprising:
    a mechanical body;
    a reagent-draining chamber with an exposed tip that extends downward through the mechanical body;
    a porous, hemispherically shaped cap fitted above the reagent-draining chamber;
    a compliant wicking medium mounted above, and partially in contact with, the porous cap; and
    a mechanism that moves the mechanical body to a position in which the wicking medium contacts frit material at one end of a reaction chamber in order to drain, by capillary action, a reagent solution from within the reaction chamber into the wicking medium and that, once the reagent solution is drained into the wicking medium, moves the mechanical body away from the one end of the reaction chamber.

11. The reagent-solution-removal subcomponent of the automated-oligonucleotide-synthesis system of claim 1 further comprising:
    one or more lips that contact a base at the end of the reaction chamber to ensure that the wicking medium and porous cap below the wicking medium do not contact the frit material with sufficient force to disturb or displace the frit material.

12. The reagent-solution-removal subcomponent of the automated-oligonucleotide-synthesis system of claim 1 further comprising:
    a vacuum line affixed to the exposed tip of the reagent-draining chamber.

13. The reagent-solution-removal subcomponent of the automated-oligonucleotide-synthesis system of claim 3 wherein a vacuum is applied through the vacuum line when the mechanical body has been moved away from the one end of the reaction chamber to facilitate removal of reagent solution from the wicking material.

14. The reagent-solution-removal subcomponent of the automated-oligonucleotide-synthesis system of claim 10 wherein the wicking medium is a layer of solution-absorbing material that is chemically unreactive towards the solution.

15. The reagent-solution-removal subcomponent of the automated-oligonucleotide-synthesis system of claim 10 wherein the wicking medium is selected from among:
    a compliant material, such as a sponge, felt, soft plastic, non-woven material, or paper; and
    a woven material, rigid plastic, sintered material.

16. The reagent-solution-removal subcomponent of the automated-oligonucleotide-synthesis system of claim 10 wherein the wicking medium is selected from among:
  polypropylene felt;
  a synthetic-polymer-based material, including polypropylene, polyethylene, polyfluoroethylene, polyester, nylon, and other synthetic-polymer-based materials;
  a natural biopolymer material, including cellulose, wool, cotton, and other natural materials;
  paper;
  a glass-fiber filter membrane; and
  a porous plastic material.

17. The reagent-solution-removal subcomponent of the automated-oligonucleotide-synthesis system of claim 10 wherein the solution is one of:
  a reagent solution added to the reaction chamber to imitate a chemical-reaction step of a polymer-synthesis protocol; and
  a solvent or solvent solution added to the reaction chamber to wash a nascent polymer and a solid substrate to which the nascent polymer is bound in preparation for carrying out a subsequent chemical-reaction step of a polymer-synthesis protocol.

\* \* \* \* \*